Patented July 8, 1924.

1,500,303

UNITED STATES PATENT OFFICE.

CARLETON ELLIS, OF MONTCLAIR, NEW JERSEY.

PROCESS OF MAKING RESINOUS MATERIAL FROM PARALDEHYDE.

No Drawing.　　　Application filed July 3, 1923. Serial No. 649,377.

*To all whom it may concern:*

Be it known that I, CARLETON ELLIS, a citizen of the United States, and a resident of Montclair, in the county of Essex and State of New Jersey, have invented certain new and useful Improvements in Processes of Making Resinous Material from Paraldehyde, of which the following is a specification.

This invention relates to a process of making a resin by the reaction of paraldehyde, in the presence of an acid catalyst, with phenol, cresol or other suitably reactive phenolic substance.

Resinification reactions between phenol and acetaldehyde are carried out with some difficulty owing to the highly volatile nature of acetaldehyde. On the other hand paraldehyde is a liquid which can be readily shipped and handled. Acetaldehyde reacts with phenol with the evolution of considerable heat. Paraldehyde when broken down into acetaldehyde by the addition of a small quantity of strong mineral acid absorbs heat. These features are utilized in the present invention as a means of regulating the control of temperature during resinification. If the entire amount of paraldehyde is added at one time to the requisite quantity of phenol in the presence of an acid catalyst the reaction especially on the large scale may become too violent yielding an unsatisfactory product.

In the present invention the paraldehyde is preferably added gradually to a quantity of phenol in the presence of an acid catalyst and the absorption of heat by conversion of paraldehyde into acetaldehyde may be used to counter-act the evolution of heat due to reaction between acetaldehyde and phenol. By proportioning the rate of addition of the paraldehyde a satisfactory control of the temperature of the batch may be obtained.

Thus for example approximately 100 parts of phenol are acidulated with 1 part of concentrated hydrochloric acid and 50 parts of paraldehyde are added very slowly. Reaction takes place and the paraldehyde may be added at such a rate as to permit the reaction mixture to become warm. It is allowed to stand for a time, for example overnight, and the following day is heated for 1 hour at a temperature of 150° C. under reflux condenser.

Finally any free mineral acid may be neutralized by the addition of a small quantity of sodium carbonate or other neutralizing agent. The resin so obtained may be dissolved in a solvent such as acetone and mixed with asbestos fibre or other filling material. It may be molded in the cold and subsequently baked according to the cold molding procedure or it may be molded in hot press, cooled somewhat and removed from the mold. The molded articles obtained in this manner are not infusible.

Or a mixture may be made of the resin with equal parts of wood flour. The resin is dissolved in a solvent, 5 to 10 per cent of hexamethylenetetramine added, and the wood flour impregnated with this mixture. The composition is dried and may be ground in a ball mill with 2 or 3 per cent of aluminum palmitate. On exposing to a temperature of 160–170° C. for 2 to 4 minutes a well-cured molded article is obtained.

In preparing a resin from paraldehyde the proportion of the latter with reference to the phenol may be varied considerably. If an excess of paraldehyde is used above that which will combine with the phenol the acetaldehyde obtained may be withdrawn and suitably collected. If an excess of phenol is used it may remain in the resin to serve as a flux or it may be removed by steam distillation.

Ordinarily the product of the reaction is a fusible reddish brown resin which is soluble in acetone or denatured alcohol. Such a resinous material may be used for hot or cold molding in the plastic field or in the varnish industry. It gradually hardens on baking and the effect may be accelerated by the addition of hexamethylene-tetramine.

The reaction may be carried out at or below atmospheric pressure, for example as indicated in a vessel equipped with a reflux condenser. The reaction also may be carried out in a closed vessel. Other substances besides hydrochloric or sulphuric acid may be used as catalysts. The acid catalyst employed may be added either to the phenol or the paraldehyde but preferably to the former. The subsequent heating operation at 150° C. is for the purpose of finishing the reaction and bringing about a greater degree of resinification resulting in a harder product. This secondary heating is not necessarily employed in all cases but is desirable. The temperature given for secondary heating is 150° C. but higher or lower temperatures may be used in some cases.

What I claim is:

1. The process of making a resin which comprises adding paraldehyde to a reactive phenol capable of resinification therewith, in the presence of an acid catalyst, the addition being made very gradually to obtain a chilling effect in part compensating for the heat of the reaction whereby regulation of the temperature is better effected.

2. The process of making a resin which comprises adding to a bulk of a reactive phenolic body capable of resinification a quantity of paraldehyde sufficient to bring about resinification in the presence of an acid catalyst and in causing the addition of paraldehyde to be gradual whereby overheating is avoided and in removing any excess of aldehyde or phenol from the resulting resin.

3. The process which comprises adding paraldehyde very gradually to phenol in the presence of a mineral acid to cause resinification without overheating and in subsequently maintaining the temperature at about 150° C. for a period of time to accomplish a greater degree of resinification.

CARLETON ELLIS.